United States Patent
Jang et al.

(10) Patent No.: US 9,800,682 B2
(45) Date of Patent: Oct. 24, 2017

(54) NODE AND COMMUNICATION METHOD FOR SUPPORTING CONTENT MOBILITY

(71) Applicant: Samsung Electronics Co., Ltd., Suwon-si (KR)

(72) Inventors: Myeong Wuk Jang, Hwaseong-si (KR); Young In Bae, Yongin-si (KR); Seog Chung Seo, Seoul (KR); Byoung Joon Lee, Seongnam-si (KR); Seong Ik Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 618 days.

(21) Appl. No.: 14/301,470

(22) Filed: Jun. 11, 2014

(65) Prior Publication Data

US 2014/0365550 A1    Dec. 11, 2014

(30) Foreign Application Priority Data

Jun. 11, 2013    (KR) .................... 10-2013-0066698

(51) Int. Cl.
*G06F 15/16*    (2006.01)
*H04L 29/08*    (2006.01)

(52) U.S. Cl.
CPC ........ *H04L 67/2842* (2013.01); *H04L 67/327* (2013.01)

(58) Field of Classification Search
CPC ..................... H04L 67/2842; H04L 67/327
See application file for complete search history.

(56) References Cited

U.S. PATENT DOCUMENTS

| | | | |
|---|---|---|---|
| 6,192,408 B1 * | 2/2001 | Vahalia | G06F 17/30171 |
| | | | 707/E17.007 |
| 7,949,682 B2 | 5/2011 | Mair et al. | |
| 8,160,069 B2 | 4/2012 | Jacobson et al. | |
| 9,043,567 B1 * | 5/2015 | Modukuri | G06F 3/0665 |
| | | | 711/162 |
| 2005/0097073 A1 | 5/2005 | Mair et al. | |
| 2009/0287835 A1 | 11/2009 | Jacobson | |

(Continued)

FOREIGN PATENT DOCUMENTS

KR    10-2012-0134519 A    12/2012

OTHER PUBLICATIONS

Baid, Akash, Tam Vu, and Dipankar Raychaudhuri. "Comparing Alternative Approaches for Networking of Named Objects in the Future Internet". IEEE INFOCOM 2012 Workshop on Emerging Design Choices in Name-Oriented Networking, 2012 IEEE (pp. 298-303).

(Continued)

*Primary Examiner* — Viet Vu
(74) *Attorney, Agent, or Firm* — NSIP Law (57) ABSTRACT

Provided is a node and a communication method of the node in a content oriented network (CON) in which the communication method of the node included in the CON may include receiving, at a receiver, a content request packet having a content name comprising hierarchical name components and flat name components, extracting the hierarchical name components and the flat name components from the content request packet, and processing the content request packet using the hierarchical name components and the flat name components.

18 Claims, 8 Drawing Sheets

(56) References Cited

U.S. PATENT DOCUMENTS

2011/0137966 A1* 6/2011 Srinivasan .......... H04L 67/1097
707/828
2012/0290696 A1* 11/2012 Wu ................... G06F 17/30197
709/223

OTHER PUBLICATIONS

Song, Y., & Koyanagi, K. (Jun. 2011). "Study on a Hybrid P2P based DNS". In Computer Science and Automation Engineering (CSAE), (pp. 152-155).
Varvello, M., Perino, D., & Esteban, J. "Caesar: A content router for high speed forwarding", In Proceedings of the second edition of the ICN workshop on Information-centric networking (Aug. 2012) pp. 73-78.
Wang, Y., He, K., Dai, H., Meng, W., Jiang, J., Liu, B., & Chen, Y. (Jun. 2012). Scalable Name Lookup in NDN Using Effective Name Component Encoding. 2012 $32^{nd}$ IEEE International Conference on Distributed Computing Systems (pp. 688-697).
Lin, Fuhong, Yueyun Chen, Jianwei An, and Xianwei Zhou. "A hierarchical name system based on hybrid P2P for Data-Centric Networks". 2012 Fourth International Conference on Multimedia Information Networking and Security (pp. 632-635).

* cited by examiner

NODE AND COMMUNICATION METHOD FOR SUPPORTING CONTENT MOBILITY

RELATED APPLICATIONS

This application claims the benefit under 35 U.S.C. §119(a) of Korean Patent Application No. 10-2013-0066698, filed on Jun. 11, 2013, in the Korean Intellectual Property Office, the entire disclosure of which is incorporated herein by reference for all purposes.

BACKGROUND

1. Field

The following description relates to a node and a communication method of the node for supporting content mobility in a content oriented network (CON).

2. Description of Related Art

In a content oriented network (CON), a content request packet may include a hierarchical name of a content to be fetched. When a content request packet is received at nodes in the network, the content request packet may be transmitted via an interface in a direction facing a node where a content corresponding to the name of the content included in the content request packet is stored. The node having the corresponding content may transmit the content to a node requesting the content by searching for the content based on the received name of the content and by transmitting the corresponding content via the interface through which the content request packet is received.

This operational method is different than terminal address-based networking, in which a packet is transmitted based on a destination address value, for example, 75.2.35.27, in an Internet Protocol (IP) header, in terms of an address format and a content transmission method.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a communication method of a node in a content oriented network (CON), the communication method including receiving, at a receiver, a content request packet having a content name comprising hierarchical name components and flat name components, extracting the hierarchical name components and the flat name components from the content request packet, and processing the content request packet using the hierarchical name components and the flat name components.

The processing of the content request packet may include verifying, using the flat name components, whether the content is stored in a content cache of the node.

The method may include determining whether an entry comprising the flat name components is included in a request management table of the node, in response to the content being absent in the content cache.

The method may include in response to the entry comprising the flat name components being included in the request management table, adding, to the entry, information associated with a route through which the content request packet is received.

The method may include in response to the content not being included in the content cache and the node not using a content request table, determining whether an entry based on a prefix of the hierarchical name components is included in a forwarding table of the node.

The method may include in response to the entry including the same flat name components not being included in the request management table, determining whether an entry based on a prefix of the hierarchical name components is included in a forwarding table of the node.

The method may include in response to the entry based on the prefix of the hierarchical name components being included in the forwarding table, transmitting the content request packet using the hierarchical name components.

The method may include in response to the entry based on the prefix of the hierarchical name components being included in the forwarding table and the node using the request management table, adding the entry based on the flat name components to the request management table.

The hierarchical name components may be used to forward the content request packet.

The flat name components may be used to identify the content.

In one general aspect, there is provided a node in a content oriented network (CON), the node including a receiver configured to receive a content request packet having a name of a content comprising hierarchical name components and flat name components, an extractor configured to extract the hierarchical name components and the flat name components from the content request packet, and a processor configured to process the content request packet using the hierarchical name components and the flat name components.

The node may include a content cache configured to store the content, and wherein the processor is further configured to verify, using the flat name components, whether the content is stored in the content cache.

The node may include a request management table configured to index entries including the flat name components of the content, and wherein the processor is further configured to determine whether an entry including the flat name components is included in the request management table, in response to the content being absent in the content cache.

The processor may be further configured to add, to the entry, information associated with a route through which the content request packet is received, in response to the entry comprising the flat name components being included in the request management table.

The node may include a forwarding table configured to index entries including the hierarchical name components, wherein the processor is further configured to determine whether an entry based on a prefix of the hierarchical name components is included in the forwarding table, in response to the node not using a request management table.

The node may include a forwarding table configured to index entries including the hierarchical name components, and wherein the processor is further configured to determine whether an entry based on a prefix of the hierarchical name components is included in the forwarding table, in response to the entry including the flat name components being absent in the request management table, or the node not using a content request table.

The processor may be further configured to transmit the content request packet using the hierarchical name components, in response to the entry based on the prefix of the hierarchical name components being included in the forwarding table.

The processor may be further configured to add the entry based on the flat name components to the request management table, in response to the entry based on the prefix of the hierarchical name components being included in the forwarding table and the node using a request management table.

The hierarchical name components may be used to forward the content request packet, and the flat name components are used to identify the content.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The term node as used herein may be understood as including networking devices, for example, an access point, a router, and the like, as well as customer electronics (CE) devices. As a non-exhaustive illustration only, the CE device described herein may refer to mobile devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device or portable navigation device (PND), a handheld game console, an e-book, and devices such as a high definition television (HDTV), an optical disc player, a DVD player, a Blue-ray player, a setup box, robot cleaners, or any other device capable of wireless communication or network communication consistent with that disclosed herein.

A content oriented network (CON) may refer to a networking architecture where a corresponding content is fetched based on information associated with the content, for example, a name of the content. Here, the content may include, but is not limited to, a service and information in an information centric network (ICN) as well as a content or a segment of the content in a content centric network (CCN). The following disclosure may be applied to a CCN or an ICN and may also be equally applied to any CON using a similar architecture.

Figure 1:
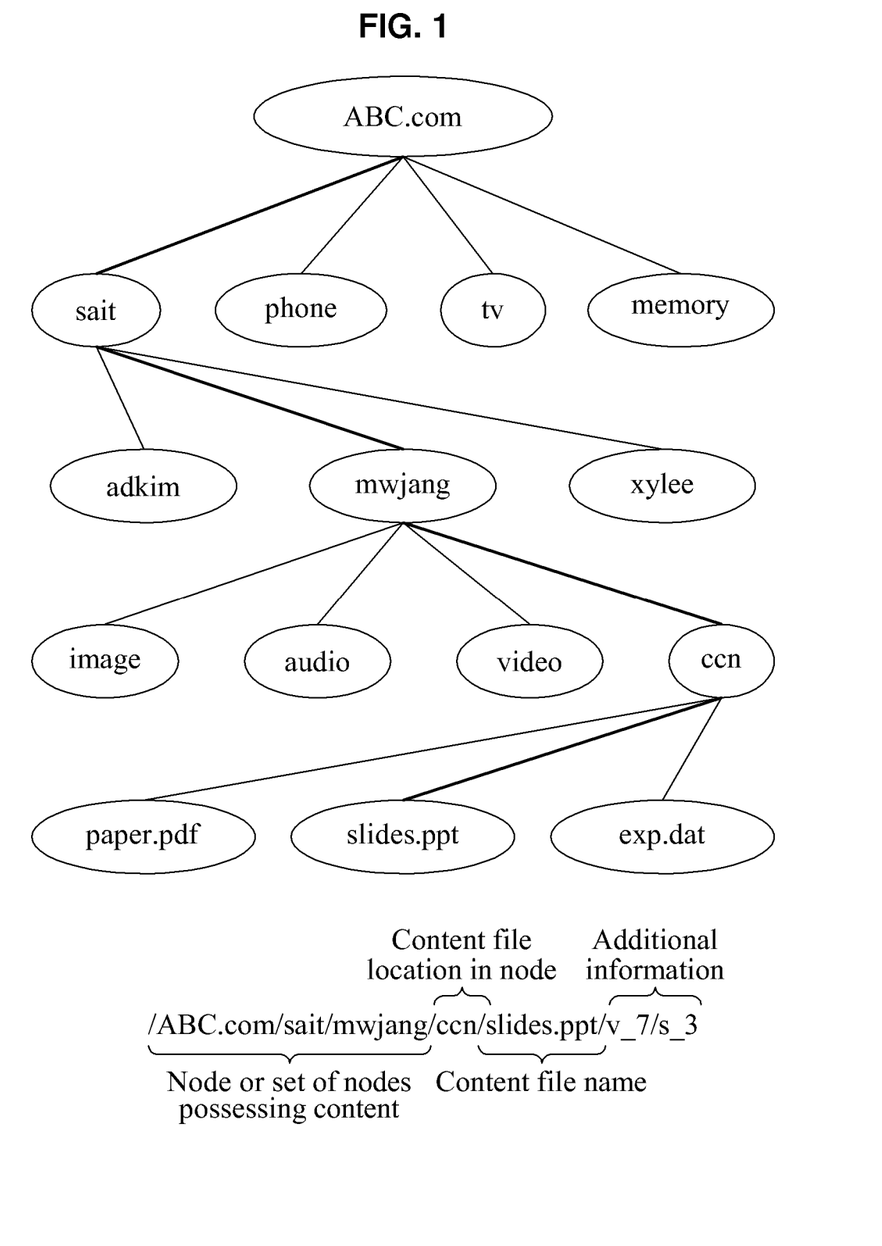
FIG. 1 is a diagram illustrating an example of a hierarchical name structure of a content in a content oriented network (CON).

FIG. 1 is a diagram illustrating an example of a hierarchical name structure of a content in a CCN that is an example of a CON. Referring to FIG. 1, a hierarchical structure formed according to an inclusion relationship of virtual groups in a CON, and a hierarchical name of a content based on the hierarchical structure are described.

A hierarchical structure indicated by bold lines in FIG. 1 may be formed between groups including a content having a name, for example, "slides.ppt," according to an inclusion relationship of virtual groups in a network. Also, a hierarchical name of the content based on the hierarchical structure may be made up of a plurality of name components, for example, "/ABC.com/sait/mwjang/ccn/slides.ppt/v_7/s_3."

The name components of the content may be classified into four classes based on meaning. A first class, Class 1, refers to a particular node or a set of nodes in which the content is placed, for example, "/ABC.com/sait/mwjang." A second class, Class 2, refers to a storage location of the content file within the node, for example, "/ccn." A third class, Class 3, refers to a file name or a service name of the content, for example, "/slides.ppt." A fourth class, Class 4, refers to additional information such as version information and a segment number, for example, "/v_7/s_3."

However, even though the hierarchical name of the content is identical, the class of the name components may be interpreted differently at each node. For example, "/ABC.com/sait/mwjang" may be recognized as Class 1 and "/ccn" may be recognized as Class 2 at a node A. However, "/ABC.com" may be recognized as Class 1 and "/sait/mwjang/ccn" may be recognized as Class 2 at a node B.

Also, the hierarchical name structure may have different formats based on a type of a CON. For example, in addition to the above classes of the name components, a new class may be added for a special purpose, for example, a command, a parameter, a hash value, and the like. Also, some of the above classes, for example, an additional information class may be omitted.

In the representation of the hierarchical name, separators other than '/', for example, '.' may be used, and in the representation format, the component class designating a node or a set of nodes may be located in a last position of the name rather than a first position. Although FIG. 1 shows one example of a hierarchical name of a content by way of illustration only, the present invention is not limited thereby as various changes and modifications can be made and various hierarchical name formats may be used.

Figure 2:
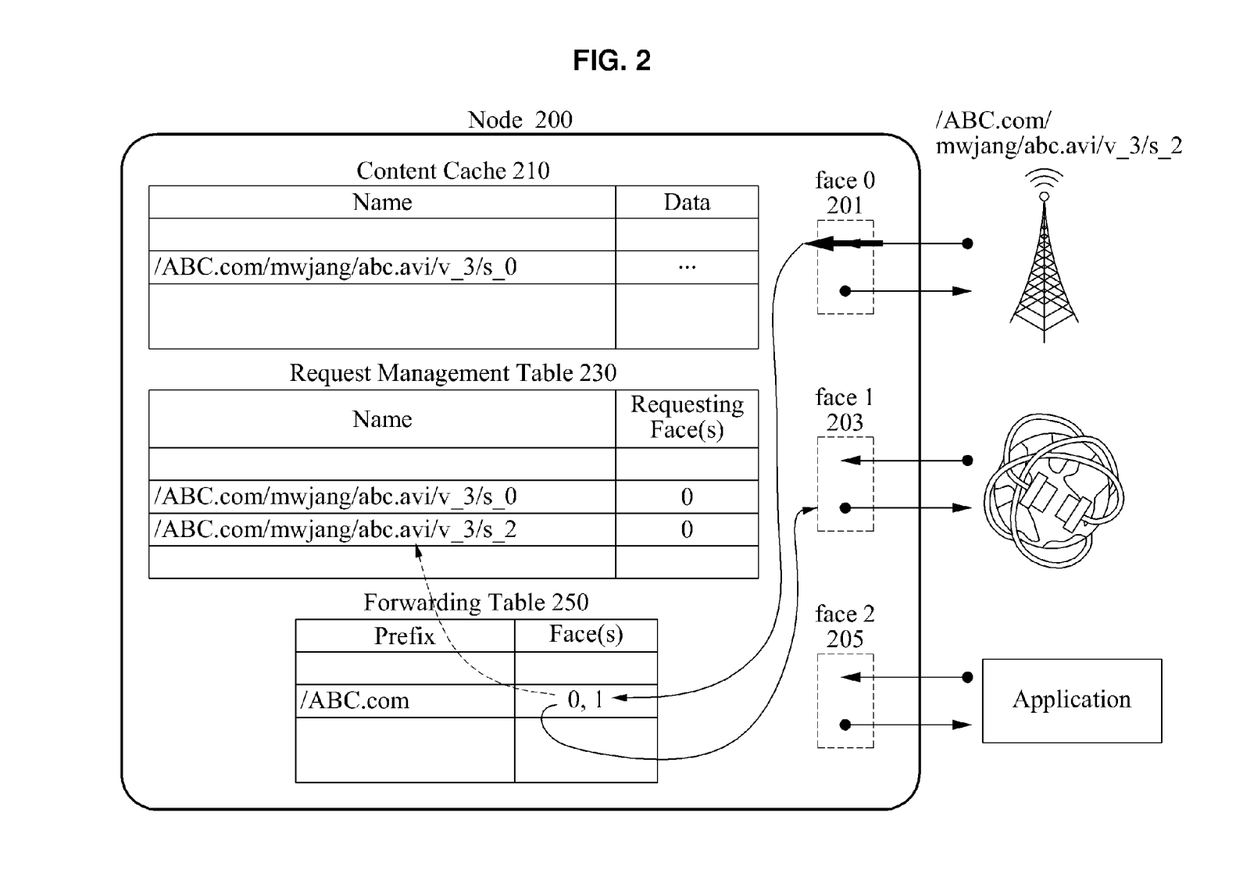
FIG. 2 is a diagram illustrating an example of a method of processing a content request packet including a hierarchical name in a CON.

FIG. 2 is a diagram illustrating an example of a method of processing a content request packet including a hierarchical name in a CCN that is an example of a CON.

In a CCN, a name of a content functions as a director or a compass to transmit a content request packet to a node in which the content is stored, and functions as an identifier to distinguish the corresponding content from other contents. Accordingly, each content uses a unique name, and contents having different names may be regarded as different contents even though the same information is included therein. For example, when two files are the same, but have different names, for example, "/ABC.com/sait/video/intro.avi" and "/ABC.com/sait/comm/video/intro.avi," the two files are recognized as different contents. This rule is useful in distinguishing different contents with similar names.

In FIG. 2, a method of processing a content request packet in a CCN, which is an example of a CON, is provided to describe a process of fetching a content using a hierarchical name of the corresponding content. Referring to FIG. 2, a node 200 included in a CCN may include a face 0 201, a face 1 203, a face 2 205 connected to an application, a content cache 210 a request management table 230, and a forwarding table 250. The content cache 210 refers to a type of a storage space for storing contents and is also referred to as a content store in the CCN.

The request management table 230 refers to a table configured to manage information associated with a content request packet and is also referred to as a pending interest table (PIT) in the CCN. The request management table 230 may store information required to manage a content request, for example, a name of a content requested through a packet and a number of faces through which a packet is transmitted.

The forwarding table 250 refers to a table configured to store information required to transmit a content request packet and is also referred to as a forwarding information table (FIB) in the CCN. The forwarding table 250 may store information required to forward a content request packet, for example, a prefix of a content name and information associated with a number of faces through which a content request packet is transmitted. The term face refers to a path through which a communication packet is transmitted, and may also be referred to as "interface."

In an example, the node 200 receives, via the face 0 201, for example, from another node included in the CCN, a content request packet requesting a content corresponding to a name, for example, "/ABC.com/mwjang/abc.avi/v_3/s_2."

A networking module of the node 200 verifies whether the corresponding content or data is present in the content cache 210 based on the name of the content in the content request packet.

When the corresponding content is present in the content cache 210, the node 200 transmits the corresponding content to the face 0 201 via which the content request packet is received. When the corresponding content is not stored in the content cache 210, as shown in FIG. 2, the node 200 verifies whether an entry stored with the same name of the content is present in the request management table 230, to verify whether the same content request message is currently being processed.

When the entry stored with the same name of the content is included in the request management table 230, the node 200 adds information associated with a requesting face, i.e., the face 0 201 on which the content request packet comes in to the corresponding entry in the request management table 230, to recall a route along which the content request packet is received. When the corresponding entry is absent in the request management table 230, the node 200 performs a lookup in the forwarding table 250 based on the name of the content. In this example, the node 200 conducts a search for information associated with a prefix of the hierarchical name and a prefix registered in an entry of the forwarding table 250, using longest prefix matching, for example, "/ABC.com."

The node 200 determines a face to be used to forward the content request packet, in this example, the face 1 203, based on information registered in the forwarding table 250, and transmits the content request packet via the corresponding face 1 203.

In this example, the node 200 registers, in the request management table 230, information '0' regarding the face 0 201 on which the content request packet comes in. Registration is performed to transmit a data packet including the corresponding content to a node requesting the corresponding content via the face 0 201 when the data packet is received in the future. When selecting a face to be used to forward the content request packet based on the forwarding table 250, the node 200 may exclude the face via which the content request packet is received. In this example, the face 0 201 from face candidates, for example, the face 0 201 and the face 1 203, for transmitting the content request packet. This may avoid a phenomenon in which the content request packet is transmitted iteratively, for example, a loop.

Figure 3:
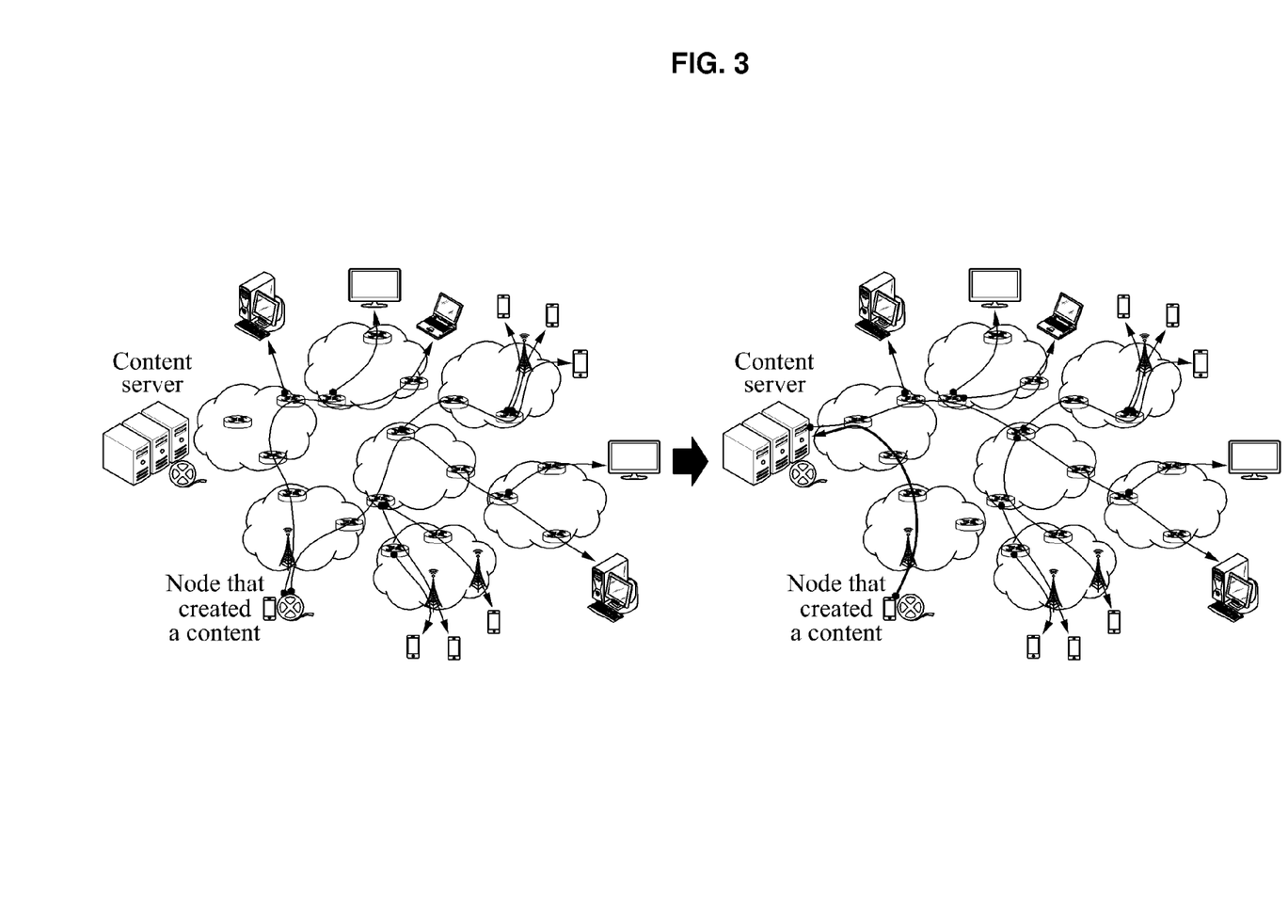
FIG. 3 is a diagram illustrating an example of content distribution through a change in a node providing a content in a CON.

FIG. 3 is a diagram illustrating an example of content distribution through a change in a node providing a content in a CON. Referring to FIG. 3, an example of providing a content through a node other than a node created the content is described. In a CON, a name of a content may have a structure of a flat name or hierarchical name. It is understood that the flat name does not have a hierarchical name structure and the hierarchical name has a hierarchical name structure.

The flat name may be generated using an attribute of the content, for example, a creator of the content, a information related to the content, and the like, irrespective of a characteristic of a node creating the corresponding content, for example, domain information to which the node belongs. The flat names of the content have independent characteristics with respect to each other, and a size of a forwarding table used for transmitting a content request packet in the CON using only flat names may be proportional to the number of content names. This feature may require a high capacity and high speed memory for a forwarding table and thus may reduce network scalability.

The node creating the content may generate a hierarchical name including domain information, for example, "ABC.com/sait/comm," creator information, for example, "mwjang," a type or a location of the content within the node, for example, "video," and a name of the content or a file name, for example, "abc.avi," of the node at the time of creating the content.

Hierarchy in a content name may reduce a size of a forwarding table used in transmitting a content request packet and thus improve network scalability by enabling only a prefix rather than an entire content name to be used when transmitting the content request packet to the node created a content. In this instance, the forwarding table may contain a prefix of the content name. When the content name is determined based on domain information of a node that created the content, transmitting the content through a node other than the node that created the content or transmitting the content request packet to a node in which the content is currently placed may be difficult.

For example, as shown in a left portion of FIG. 3, to provide a content created at a terminal through a content server, for example, YouTube®, an entire name rather than a prefix of a content name may need to be registered in a forwarding table of a network node. When the entire name is used, use of characteristics of a hierarchical name is not made, and a required forwarding table size may be increased similar to a case in which a flat name is used, resulting in reduced network scalability.

In the network based on the hierarchical name structure of the content, when the content is intended to be provided through a content server, for example, YouTube®, rather than a node that created the content, for example, a smart phone of an individual, inefficiency exists in a manner of fetching the content based on the name of the content that is determined when creating the content.

Efficiency may be improved when the content is provided through a node other than the node that created the content. As shown in a right portion of FIG. 3, by using a concept of a flat name structure to distinguish contents as well as a concept of a hierarchical name structure to transmit the content request packet to the node in which a content is currently placed.

Based on this feature, a node providing the content is different from a node that created the content, when the same content is provided through a plurality of nodes providing the content belonging to different network domains, or when there is a need to change a prefix of a name of the node providing the content due to movement of the node providing the content, for example, when a member B of a company A is sent on business to a company C, mobility of the content may be supported more easily by changing only a part functioning as a director in the name of the content.

Figure 4:
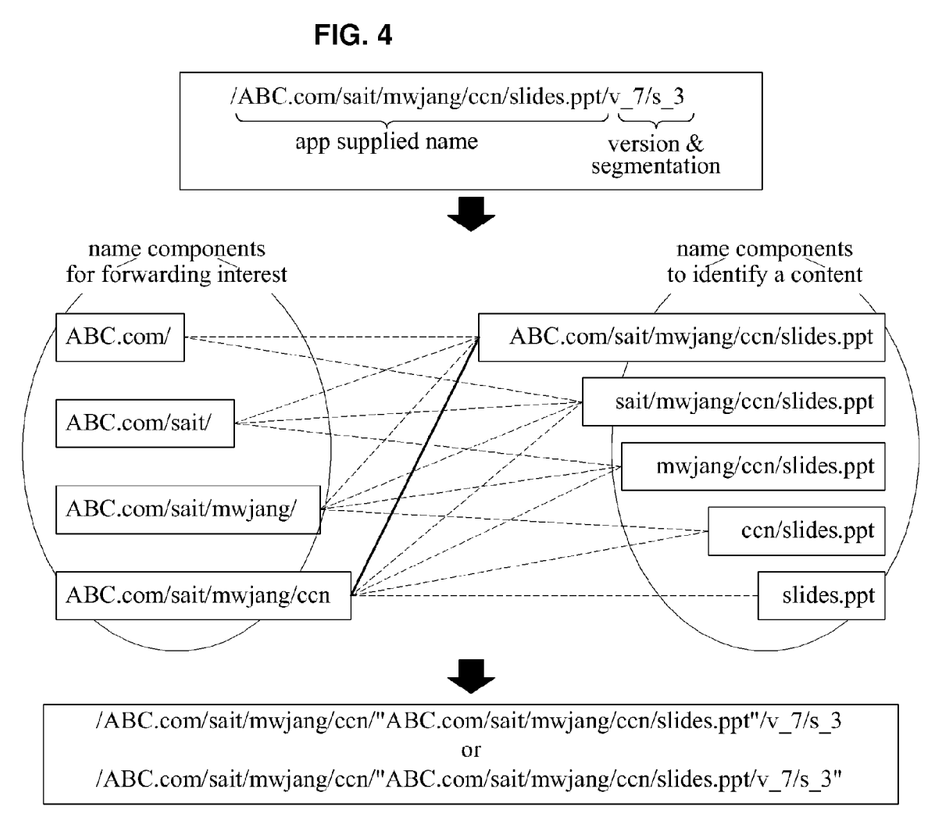
FIG. 4 is a diagram illustrating an example of segmentation and recombination of name components of a content name based on a role of the content name in a CON.

FIG. 4 is a diagram illustrating an example of segmentation and recombination of name components of a content name based on a role of the content name in a CON.

Referring to FIG. 4, possible combinations when segmenting and recombining name components corresponding to two roles, a role of a director and a role of an identifier, based on a name given when creating the content in a CON are described.

The size of a forwarding table being referred to when forwarding a content request packet may be minimized by using a name aggregation characteristic when using a hierarchical name structure. When verifying whether a content stored in a content cache within a node is present or searching for an entry of a request management table, a flat name may be more efficient than a hierarchical name.

For example, in a name of a content 'ABC.com/sait/mwjang/ccn/"ABC.com/sait/mwjang/ccn/slides.ppt"/v_7/s_3,' name components, for example, "/ABC.com/sait/mwjang/ccn/," except a globally identifiable file name, for example, "/ABC.com/sait/mwjang/ccn/slides.ppt," may be used to function as a director. In contrast, "ABC.com/sait/mwjang/ccn/slides.ppt" or "ABC.com/sait/mwjang/ccn/slides.ppt/v_7/s_3" may be used to function as an identifier to globally identify a content.

In a non-exhaustive example, the length of a name may be shortened by using flat name components when searching for a content cache or an entry of a request management table. In this instance, self-certification of a content may be also performed easily by using a public key value generated based on a hash function included in flat name components.

Figure 5:
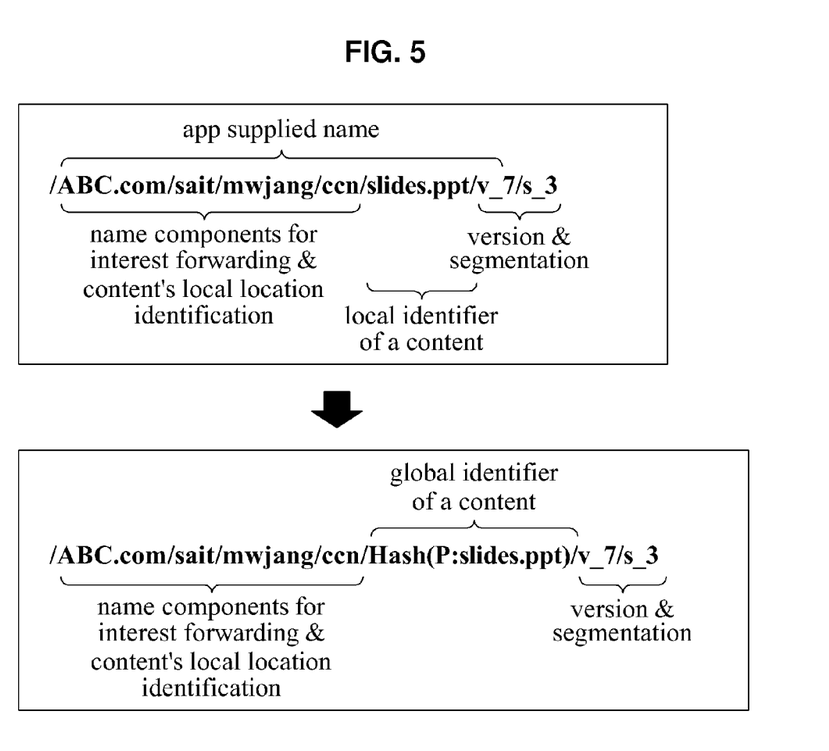
FIG. 5 is a diagram illustrating an example of a content name including hierarchical name components and flat name components used in a CON.

FIG. 5 is a diagram illustrating an example of a content name including hierarchical name components and flat name components used in a CON. Referring to FIG. 5, to support mobility of a content, a content name of a new format using a hierarchical name component part and a flat name component part, for example, a hybrid name, is described.

The flat name component part in the hybrid name may be used to identify the content or perform self-certification. Various formats may be used for the flat name component part. The flat name component part may include a public key value of a principal (node or person) creating the content, and the public key value may be generated based on a hash function.

As an example of the flat name component part including the public key value of the principal creating the content, Hash(principal's_public_key):local_content_name, Hash(prinipal's_public_key, local_content_name), Hash(principal's_public_key,content), Hash(principal's_public_key,segmented_content), DOI:Digitial Object Identifier may be cited.

Figure 6:
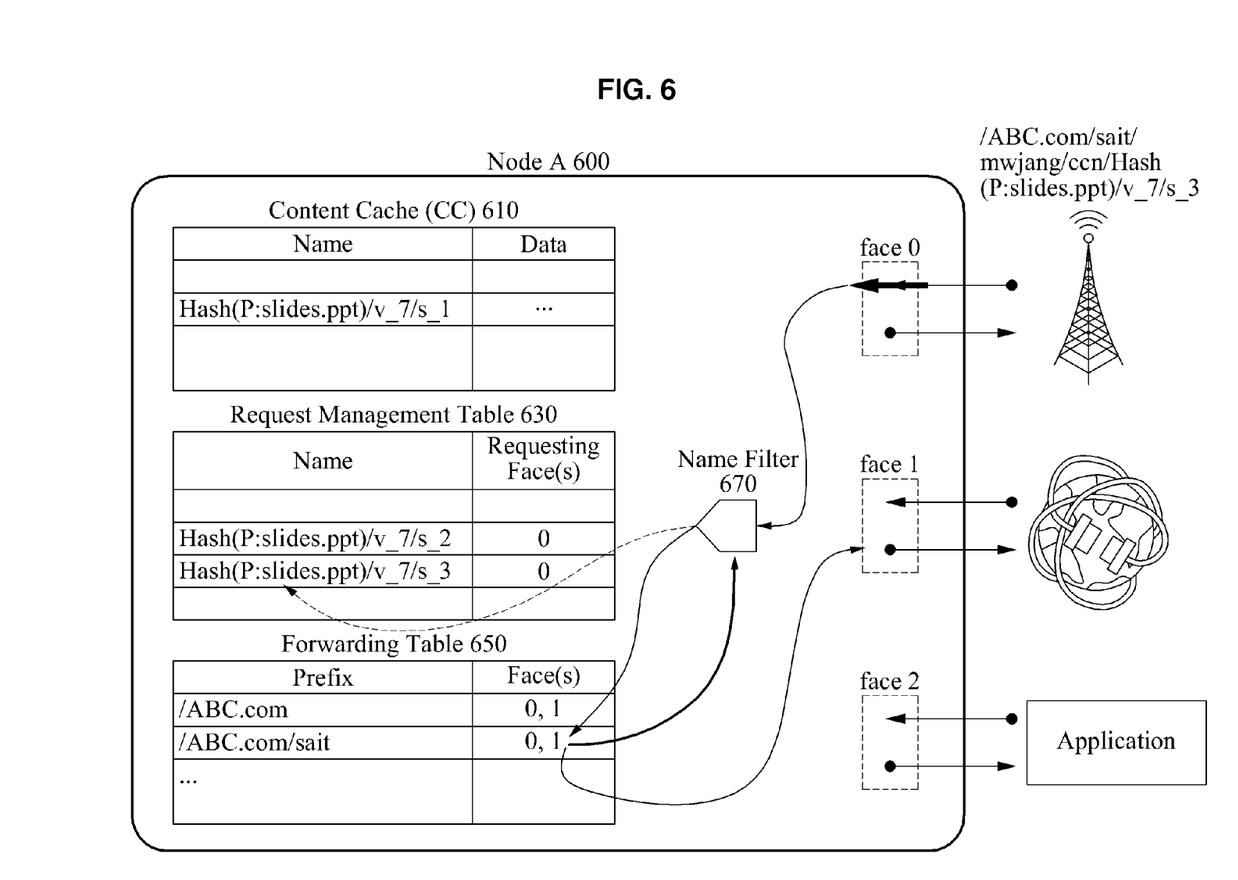
FIG. 6 is a diagram illustrating an example of a process of processing a content request packet including hierarchical name components and flat name components in a node of a CON.

FIG. 6 is a diagram illustrating an example of a process of processing a content request packet including hierarchical name components and flat name components in a node of a CON. Referring to FIG. 6, a process of processing a content request packet requesting a content corresponding to a name "/ABC.com/sait/mwjang/ccn/Hash(P:slides.ppt)/v_7/s_3" is described.

Referring to FIG. 6, a node A 600 included in a CON a face 0, a face 1, a face 2, a content cache 610, a request management table 630, and a forwarding table 650. The node A 600 may further include a name filter 670.

The node A 600 may receive the content request packet having the content name including hierarchical name components and flat name components, for example, "/ABC.com/sait/mwjang/ccn/Hash(P:slides.ppt)/v_7/s_3," from another node included in the CON via the face 0.

The hierarchical name component part of a hybrid name usually includes a plurality of name components, although it may include only a single name component. The flat name component part usually includes a single name component, for example, "Hash(P:slides.ppt/v_7/s_3)", although it may include a plurality of name components, for example, "Hash(P:slides.ppt)/v_7/s_3". When the node A 600 receives the content request packet, the node A 600 may extract the hierarchical name component part and the flat name component part from the content name included in the packet using the name filter 670. The hierarchical name component part may be, for example, "/ABC.com/sait/mwjang/ccn," and the flat name component part may be, for example, "Hash(P:slides.ppt)/v_7/s_3." The node A 600 may compare the flat name components to a name stored in the content cache 610 and the request management table 630 of the node A 600. Also, the node A 600 may compare prefixes of the hierarchical name components to a prefix of the content stored in the forwarding table 650.

Figure 7:
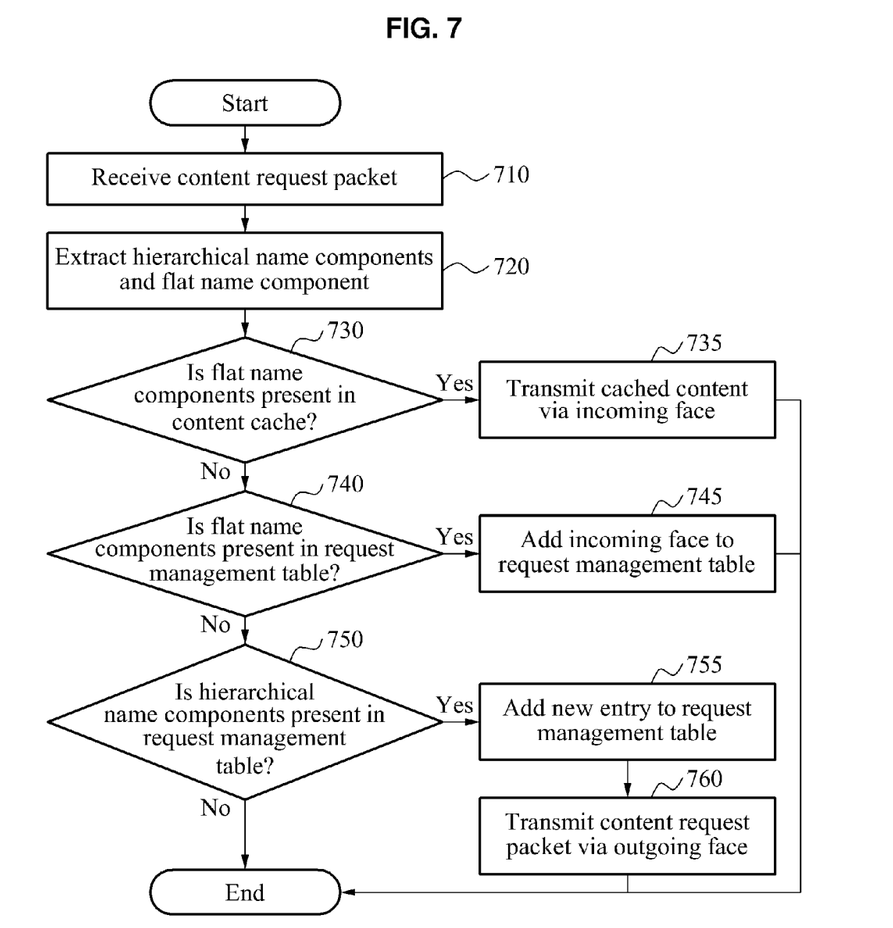
FIG. 7 is a diagram illustrating an example of a method of processing a content request packet including hierarchical name components and flat name components in a node of a CON.

FIG. 7 is a diagram illustrating a method of processing a content request packet including a hierarchical name component part and a flat name component part in a node of a CON. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. The description of FIGS. 1-6 is also applicable to FIG. 7, and thus will not be repeated here.

Referring to FIG. 7, in 710, a node or a networking module of the node may receive a content request packet having a content name including a hierarchical name component part and a flat name component part from, for example, another node included in a CON via a particular face.

In 720, the node may extract the hierarchical name component part and the flat name component part from the content request packet received in 710. The hierarchical name component part and the flat name component part may be distinguished by, for example, a hash function Hash(P: slides.ppt), or may be distinguished using a marker having a special purpose. In an non-exhaustive example, the flat name component part may be used to find matched entries in a content cache and a request management table, and the hierarchical name component part may be used to find matched entries in a forwarding table. The node may process the content request packet using the hierarchical name component part and the flat name component part extracted in 720. An example of a method of processing the content request packet in the node is described below.

In 730, the node may verify whether the corresponding content, specifically, the content having the flat name components included in the content request packet, is stored in the content cache of the node. When the corresponding content is stored in the content cache, in 735, the node may transmit the content stored in the content cache via an incoming face, i.e., a face via which the content request packet is transmitted. When the corresponding content is absent in the content cache, in 740, the node may determine whether an entry including the same flat name components is present in the request management table.

In 740, when the entry including the same flat name components is included in the request management table, in 745, the node may add information associated with the face via which the content request packet is received to the entry of the request management table. In 740, when the entry including the same flat name components is not included in the request management table, in 750, the node may determine whether an entry based on a prefix of the hierarchical name components is included in the forwarding table. The node may perform a lookup in the forwarding table using a longest prefix matching method. The node may conduct a search for information associated with a prefix of the hierarchical name and a prefix registered in an entry of the forwarding table, using longest prefix matching, for example, "/ABC.com".

When the content is absent in the content cache and the node does not use the request management table, the node may determine whether an entry based on a prefix of the hierarchical name components is included in the forwarding table of the node.

When the entry based on the prefix of the hierarchical name components is determined to be present in the forwarding table in 750, the node may deliver the content request packet using the hierarchical name components. In 755, the node may add a new entry including information associated with the incoming face, on which the content request packet comes in, with the flat name components in the request management table. In 760, the node may transmit the content request packet to another node via an outgoing face based on information associated with the face registered in the entry of the forwarding table.

Figure 8:
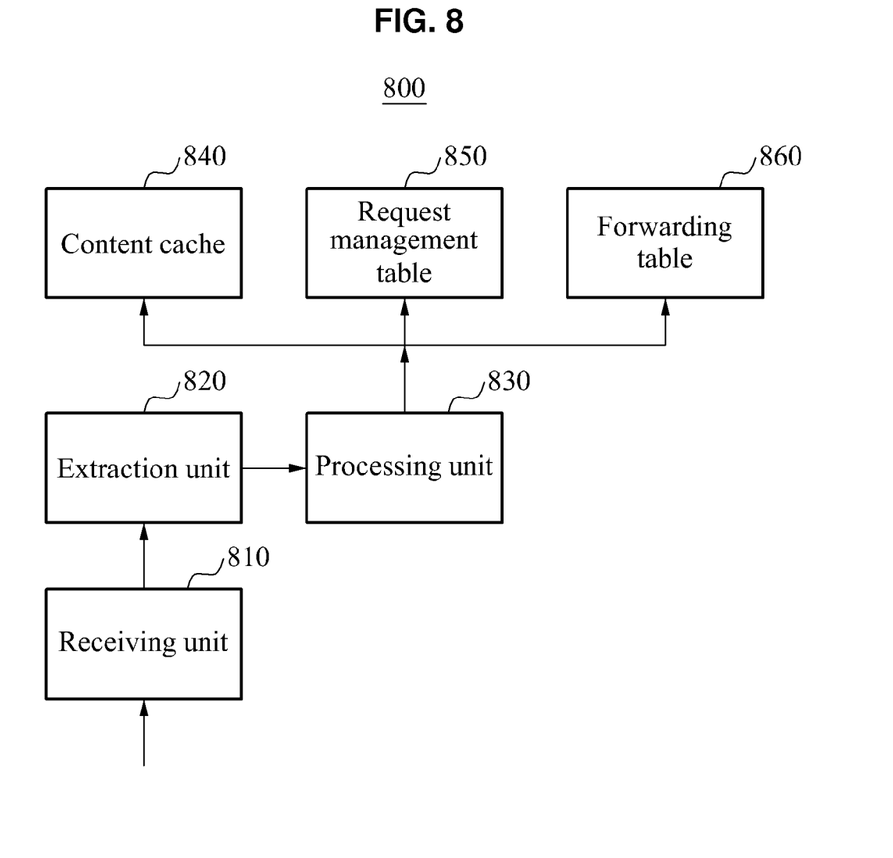
FIG. 8 is a diagram illustrating an example of a node for processing a content request packet including hierarchical name components and flat name components in a CON.

FIG. 8 is a diagram illustrating a node 800 for processing a content request packet including a hierarchical name component part and a flat name component part in a CON.

Referring to FIG. 8, the node 800 may include a receiving unit 810, an extraction unit 820, a processing unit 830, a content cache 840, a request management table 850, and a forwarding table 860.

The receiving unit 810 may receive a content request packet having a name of a content including a hierarchical name component part and a flat name component part. The hierarchical name component part may be used to forward the content request packet, and the flat name component part may be used to identify the content. The flat name component part may include a public key value of a node creating the content, and the public key value may be generated based on a hash function.

The extraction unit 820 may extract hierarchical name components and flat name components from the content request packet received by the receiving unit 810. The extraction unit 820 may include, for example, a name filter, to extract two name component parts.

The processing unit 830 may process the content request packet using the hierarchical name components and the flat name components extracted by the extraction unit 820.

The content cache 840 may store the content and the name, for example, the flat name components of the corresponding content. The processing unit 830 may verify whether the content is stored in the content cache 840 using the flat name components.

The request management table 850 may index entries including the flat name components of the content. When the content is not stored in the content cache 840, the processing unit 830 may determine whether an entry including the same flat name components is included in the request management table 850. When the entry including the same flat name components is included in the request management table 850, the processing unit 830 may add, to the entry, information associated with a face via which the content request packet is received.

The forwarding table 860 may index entries having the hierarchical name components. When an entry based on the same flat name components is not included in the request management table 850, the processing unit 830 may determine whether an entry based on a prefix of the hierarchical name components is included in the forwarding table 860.

When the node does not have the request management table 850, the processing unit 830 may determine whether the entry based on the prefix of the hierarchical name components is included in the forwarding table 860.

When the entry based on the prefix of the hierarchical name components is included in the forwarding table 860, the processing unit 830 may add the entry based on the flat name components to the request management table 850. When the entry based on a prefix of the hierarchical name components is included in the forwarding table 860, the processing unit 830 may transmit the content request packet using the hierarchical name components.

According to a non-exhaustive example, by using a hybrid name including a hierarchical name component part and a flat name component part, location information of a node providing the content may be recognized easily and whether corresponding content is present in a network node may be recognized easily. Even though name prefixes of content request packets received from multiple nodes are different, a network node may recognize and process contents created by a same creator as a same content by distinguishing a hierarchical name component part and a flat name component part.

According to a non-exhaustive example, when compared to an approach using only a hierarchical name in CON, a search speed may be improved by using only a short flat name when searching for a stored content or a content request packet in process, and a size of a forwarding table for transmitting a content request packet may be greatly reduced in comparison to an approach using only a flat name.

The processes, functions, and methods described above including a method for beamforming can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A communication method of a node in a content oriented network (CON), the communication method comprising:
   receiving, at a receiver, a content request packet having a content name comprising hierarchical name components and flat name components;
   extracting the hierarchical name components and the flat name components from the content request packet;
   processing a forwarding of the content request packet using the hierarchical name components and processing a identifying of the content request packet using the flat name components; and
   adding, to the entry, information associated with a route through which the content request packet is received, in response to an entry comprising the flat name components being included in a request management table of the node.

2. The communication method of claim 1, wherein the processing of the content request packet comprises verifying, using the flat name components, whether the content is stored in a content cache of the node.

3. The communication method of claim 2, further comprising:
   determining whether the entry comprising the flat name components is included in the request management table, in response to the content being absent in the content cache.

4. The communication method of claim 2, further comprising:
   in response to the content not being included in the content cache and the node not using the content request table,
   determining whether an entry based on a prefix of the hierarchical name components is included in a forwarding table of the node.

5. The communication method of claim 3, further comprising:
   in response to the entry including the same flat name components not being included in the request management table,
   determining whether an entry based on a prefix of the hierarchical name components is included in a forwarding table of the node.

6. The communication method of claim 5, further comprising:

in response to the entry based on the prefix of the hierarchical name components being included in the forwarding table, transmitting the content request packet using the hierarchical name components.

7. The communication method of claim 6, further comprising:

in response to the entry based on the prefix of the hierarchical name components being included in the forwarding table and the node using the request management table, adding the entry based on the flat name components to the request management table.

8. The communication method of claim 1, wherein the hierarchical name components are used to forward the content request packet.

9. The communication method of claim 1, wherein the flat name components are used to identify the content.

10. A non-transitory computer-readable medium storing instructions that, when executed by a processor, causes the processor to perform the method of claim 1.

11. A node in a content oriented network (CON), the node comprising:

a receiver configured to receive a content request packet having a name of a content comprising hierarchical name components and flat name components;

an extractor configured to extract the hierarchical name components and the flat name components from the content request packet; and a processor configured to
  process a forwarding of the content request packet using the hierarchical name components,
  process a identifying of the content request packet using the flat name components, and
  add, to an entry, information associated with a route through which the content request packet is received, in response to the entry comprising the flat name components being included in a request management table of the node.

12. The node of claim 11, further comprising:

a content cache configured to store the content, and wherein the processor is further configured to verify, using the flat name components, whether the content is stored in the content cache.

13. The node of claim 12, further comprising:

the request management table configured to index entries including the flat name components of the content, and wherein the processor is further configured to determine whether the entry including the flat name components is included in the request management table, in response to the content being absent in the content cache.

14. The node of claim 12, further comprising:

a forwarding table configured to index entries including the hierarchical name components, wherein the processor is further configured to determine whether an entry based on a prefix of the hierarchical name components is included in the forwarding table, in response to the node not using the request management table.

15. The node of claim 13, further comprising:

a forwarding table configured to index entries including the hierarchical name components, and wherein the processor is further configured to determine whether an entry based on a prefix of the hierarchical name components is included in the forwarding table, in response to the entry including the flat name components being absent in the request management table, or the node not using a content request table.

16. The node of claim 15, wherein the processor is further configured to transmit the content request packet using the hierarchical name components, in response to the entry based on the prefix of the hierarchical name components being included in the forwarding table.

17. The node of claim 16, wherein the processor is further configured to add the entry based on the flat name components to the request management table, in response to the entry based on the prefix of the hierarchical name components being included in the forwarding table and the node using the request management table.

18. The node of claim 11, wherein the hierarchical name components are used to forward the content request packet, and the flat name components are used to identify the content.

* * * * *